April 13, 1965 W. A. LINDBLOOM 3,178,517

INTEROFFICE SIGNALLING ARRANGEMENT

Filed Sept. 21, 1961 5 Sheets-Sheet 1

| FIGS. 1 & 2A | FIGS. 2B & 3 | FIG. 4 | FIG. 5A | FIGS. 5B, 6 & 7 |
|---|---|---|---|---|

*INVENTOR.*
WILLIAM A. LINDBLOOM

BY C. A. Gulbrandsen

ATTY.

April 13, 1965 W. A. LINDBLOOM 3,178,517

INTEROFFICE SIGNALLING ARRANGEMENT

Filed Sept. 21, 1961 5 Sheets-Sheet 2

FIG. 2B PAYSTATION CLR TRK. CKT. (TOLL OFFICE)

INVENTOR.
WILLIAM A. LINDBLOOM

BY [signature]

ATTY.

TWO-WAY SIGNALING
(INTER OFFICE FACILITIES)

INVENTOR.
WILLIAM A. LINDBLOOM
BY C. A. Gulbrandsen
ATTY.

April 13, 1965 — W. A. LINDBLOOM — 3,178,517

INTEROFFICE SIGNALLING ARRANGEMENT

Filed Sept. 21, 1961 — 5 Sheets-Sheet 4

INVENTOR.
WILLIAM A. LINDBLOOM

BY

ATTY.

INVENTOR.
WILLIAM A. LINDBLOOM
BY C. A. Gulbrandsen
ATTY.

3,178,517

INTEROFFICE SIGNALLING ARRANGEMENT

William A. Lindbloom, Lombard, Ill., assignor to Automatic Electric Laboratories, Inc., Northlake, Ill., a corporation of Delaware Filed Sept. 21, 1961, Ser. No. 139,663
10 Claims. (Cl. 179—27)

This invention relates in general to interoffice signalling arrangements. More particularly the invention relates to the transmission between offices of control signals, such as coin control signals, that need to be sent after the establishment of the connection.

Prior to this invention the transmission of prepay paystation coin control signals from a toll office to a remote office required separate transmission channels or trunk conductor pairs expressly for this purpose. Furthermore, in the case of duplex type signalling between the trunk circuits and the terminal equipment of the transmission medium proper, separate units of signalling equipment at both toll office and remote office ends had to be provided solely for the coin collect and coin refund operations. This was additional to signalling units associated with the trunks for dialing and supervision purposes.

Accordingly, it is a general object of this invention to provide a new and improved interoffice signalling arrangement for the transmission of signals of the general type described above.

According to its principal feature, the invention provides means in a telephone system wherein the trunk circuits at both ends are arranged for the transmission for such control signals, in the form of trains of impulses varying in number, over the two-way interoffice signalling path in addition to the transmission of ON-OFF hook signals incidental to the establishment of the connection itself.

Further features of this invention pertain to the particular arrangement of the circuit elements in the system, whereby the above outlined and additional operating features are attained.

Although the invention has a broader application than the embodiment shown herein, the accompanying drawings will serve to develop a better understanding of the invention as applied to toll service functions for prepay paystations in a remotely located automatic office, with the interoffice trunk circuits being of the duplex signalling type.

The above embodiment of the invention will now be described with reference to the accompanying drawings.

Figures 2B, 3:
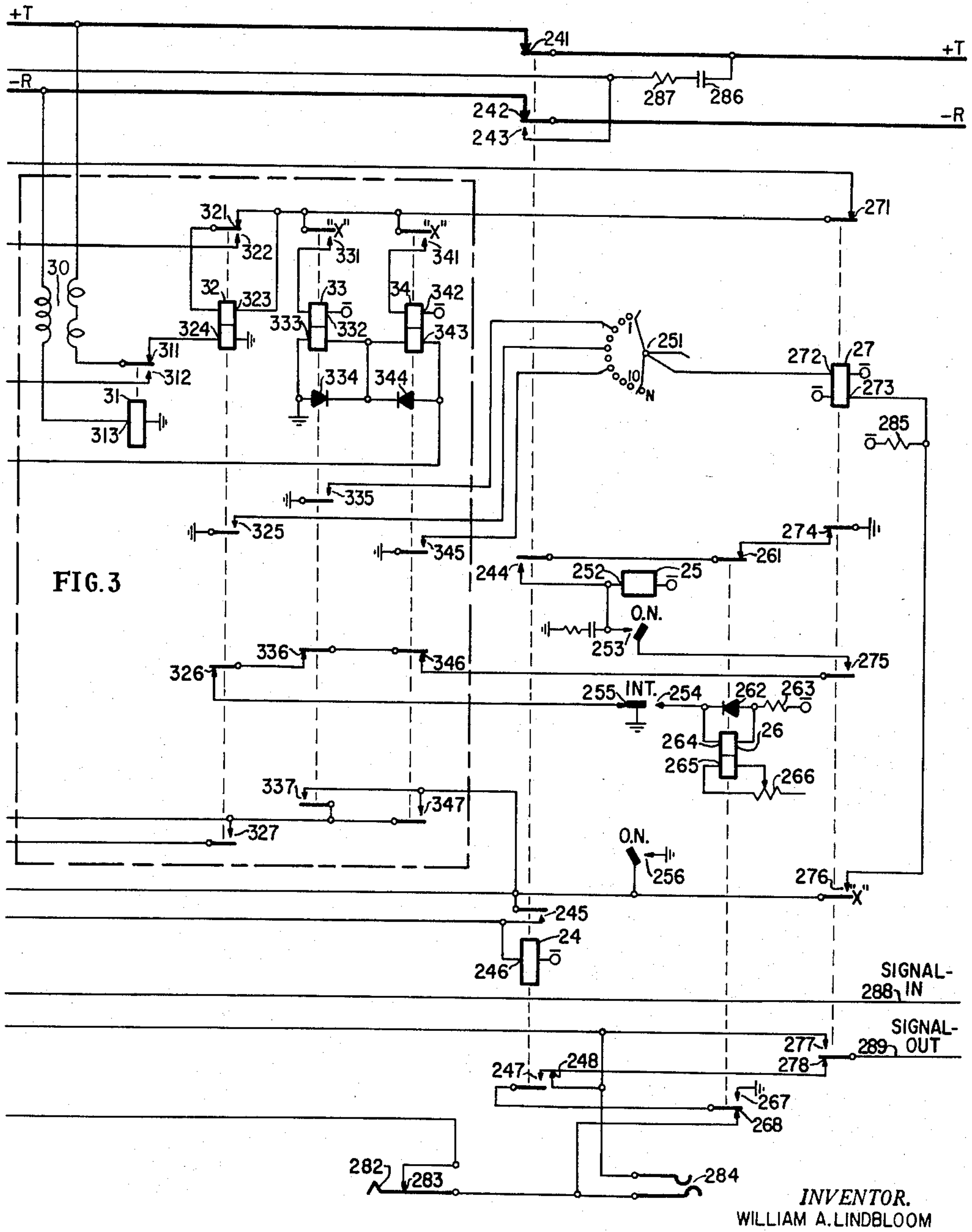
FIGURE 3 is an outlined portion of the paystation CLR trunk circuit, showing the control and marking equipment and connections for the signal sending switch.

Generally speaking, composite reference numerals have been employed in designating the apparatus on the accompanying drawings; for instance, 347 is a contact pair associated with relay 34 shown on FIGURE 3 of the drawing. This will facilitate the location of apparatus in respect to the description of the following specification. It will be noted that random numbering has been assigned in a few instances where the above composite plan could not be applied. It will also be helpful to note that the descriptive designations "signal-in" and "signal-out" have been used for denoting the signalling conductors of polar duplex, carrier, microwave or similar type trunk circuits.

Figure 4:
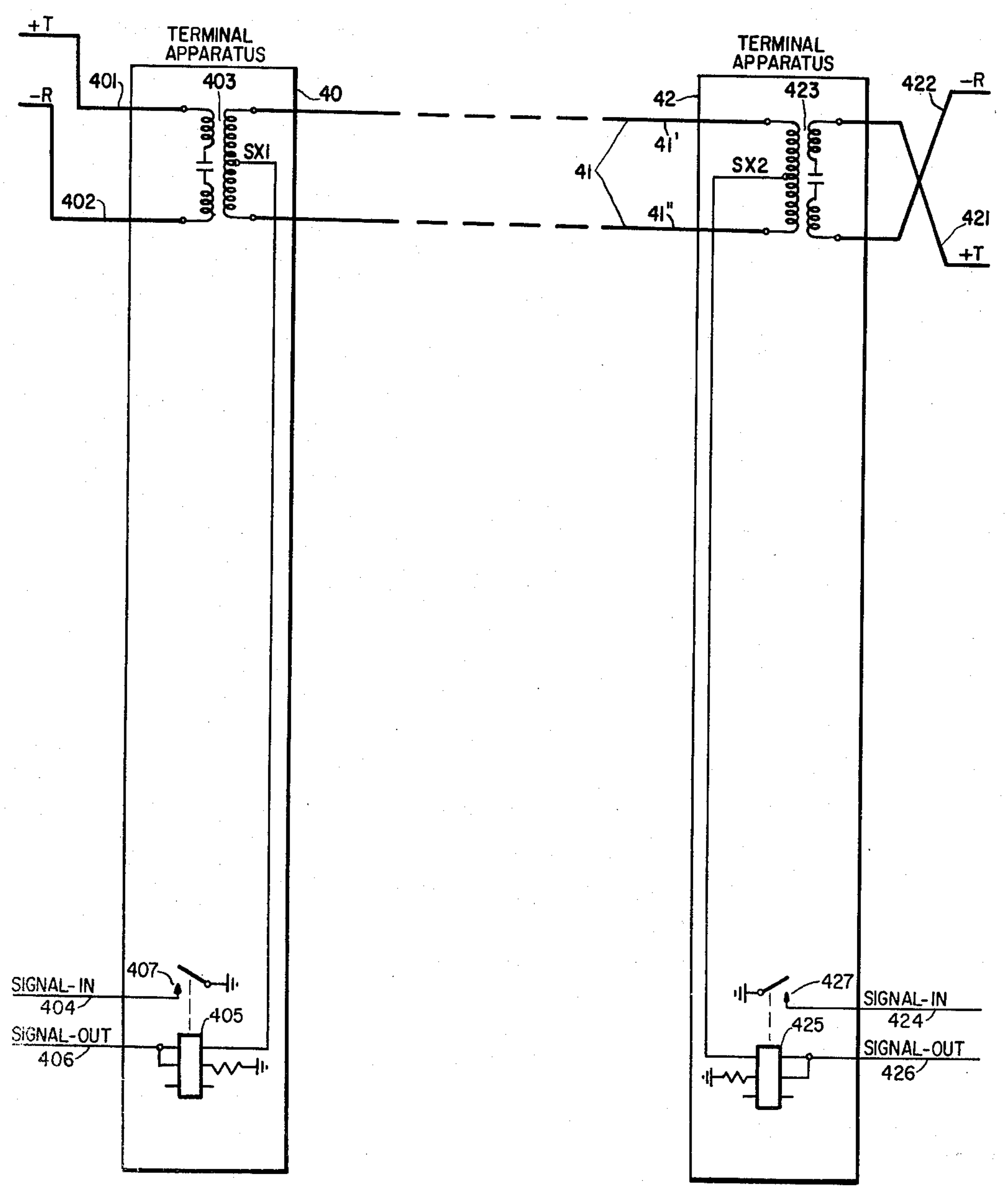
FIGURE 4 shows the terminal apparatus representative of a two-way signalling path between the toll office and the automatic office trunk circuits, using duplex type signalling between each terminal and the associated trunk circuit.

Referring now to FIG. 4, in the interoffice facilities shown, the reference numeral 41 represents a transmission medium between two offices, which may be in the form of physical conductors, superimposed carrier, microwave, or other similar means for the transmission of information from one office to another. In the embodiment shown it is assumed that the transmission medium in effect provides two paths, one being a two-way talking path and the other a two-way signalling path. The talking path is further extended through terminal apparatus 40, 42 and trunk circuits at both ends for the transmission of voice currents, such as will be evident by the association of +T conductor 401 and —R conductor 402 at the toll office end with their counterparts 421 and 422 respectively at the remote automatic office end; and the two-way signalling path is further extended through terminal apparatus 40, 42 so that an on-hook to off-hook change in potential applied to the signal-out conductor at one end is equivalent to the projection forward of a ground potential over the signal-in conductor at the other end of the signalling system. Conversely, a change from an off-hook to on-hook potential on the signal-out conductor removes the ground potential from the signal-in conductor at the other end, enabling both terminal apparatus circuits to revert to their original status. As is well known in polar duplex signalling arrangements of this kind, signalling in one direction, e.g. from left to right in FIG. 4, is independent from signalling in the other direction, i.e. from right to left in this figure.

The design of the terminal apparatus at both ends may vary according to the type of transmission medium used between the two offices. In the embodiment disclosed herein a simplex (SX) trunk including the two physical conductors 41′ and 41″ has been assumed, by reference numerals 40 and 42 in the corresponding terminal apparatus at both ends being designated in FIG. 4. It will be understood that voice transmission over this trunk takes place over the two trunk conductors 41′ and 41″ in series whereas the signalling path includes, in addition to simplex conductors SX1 and SX2 the two trunk conductors 41′ and 41″ in parallel. In this instance a typical on-hook to off-hook change is removal of ground potential and its replacement by a battery potential applied to signal-out conductor 406, through the opposing winding of polar relay 405, SX1 conductor to the midpoint of repeating coil 403, on through to physical conductors 41′ and 42″ in parallel, both sections of the winding of repeating coil 423, conductor SX2, the aiding windings of a similar polar relay 425, and then to ground potential connected to signal-out conductor 426. Polar relay 425 operates and at its contacts 427 projects ground forward over signal-in conductor 424 for control functions in its associated trunk circuit. It will be understood that reverting this off-hook state of signalling back to an on-hook potential on the signal-out conductor will be reflected as a removal of the ground from the signal-in conductor 424. The signalling from signal-out conductor 426 will provide similar controls on the distant signal-in conductor 404, namely by means of polar relay 405 and its contact 407.

Figure 5A:
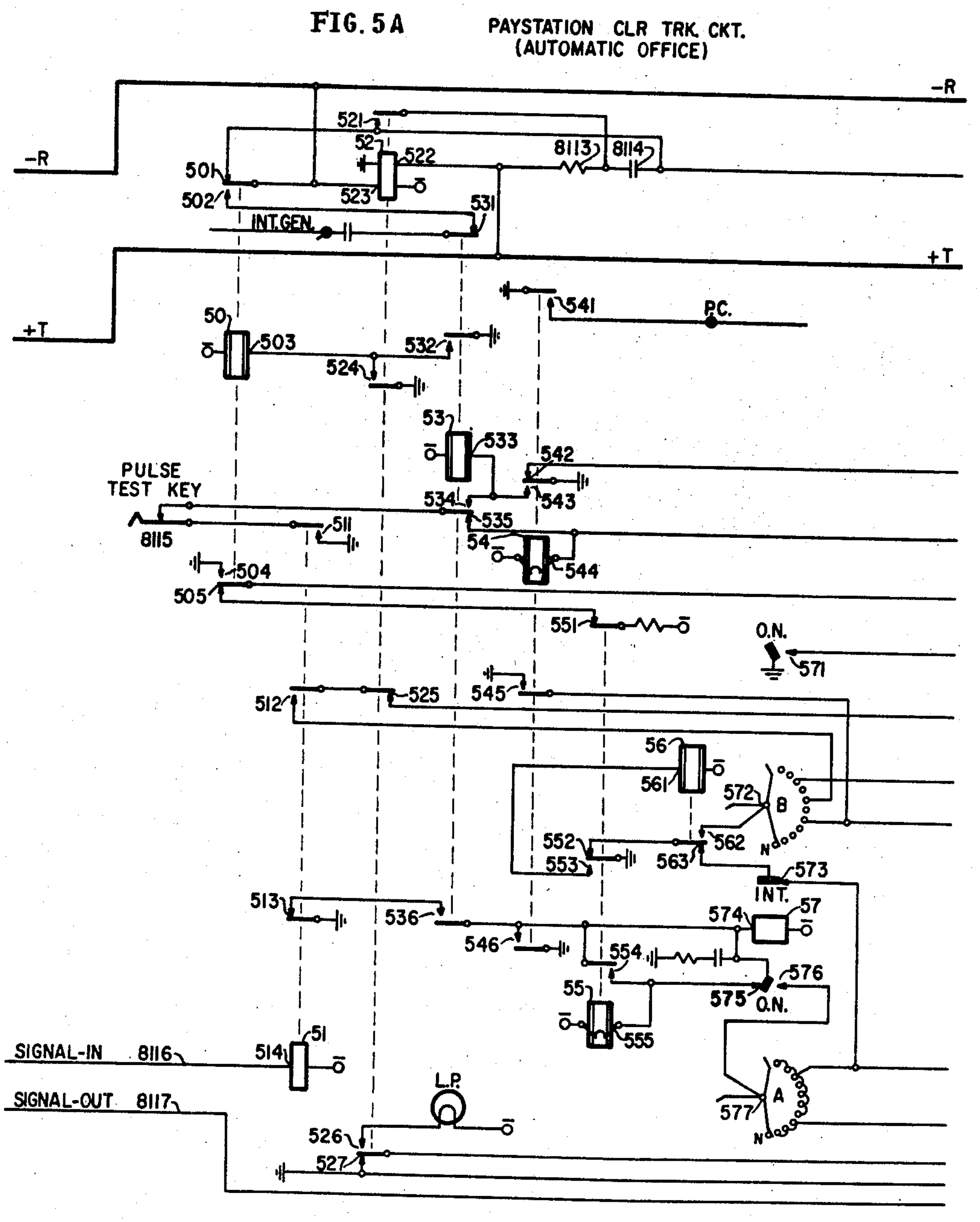
FIGURES 5A and 5B (2 sheets) show the principal portion of a paystation CLR trunk circuit, including a signal receiving switch, at a remote automatic office.

According to one feature of the invention there is provided a signal sending switch in the toll office paystation CLR trunk, FIG. 2B, which, after establishment of a connection, may be used to change the on-off signalling status on the interoffice signalling path and thereby generate a series of digital impulses for the synchronous operation of a similar signal receiving switch in the remote paystation CLR trunk, FIG. 5A, circuit. The receiving switch responds according to the number of digital impulses received, and establishes connections for the projection of electrical control potentials to the associated prepay paystation telephone for the duration of corresponding markings applied by the toll operator to a bank of the signal sending switch.

The signal sending and receiving switches in this embodiment are rotary switches designated 25, FIG. 2B, and 57, FIG. 5A, respectively. Each switch has connections for homing type operation upon completing their signalling functions. The markings applied to rotary sending switch 25 are in the nature of electrical potentials applied to the bank level associated with its wiper 251 through connections established directly or indirectly by the operation of relays 31, 32, 33 and 34 in FIG. 3. These relays operate responsive to other electrical potentials impressed upon an established telephone connection during the specific operation of toll board keys 10, 11, and 12, FIG. 1 as required for effecting corresponding control functions at the remote automatic office. The digital impulses received at the automatic office are translated by the rotary switch 57, FIG. 5A into control functions as determined by connections extended directly or indirectly to relays 60, 61, 62, and 63 of FIG. 6. They in turn apply electrical potentials by way of the automatic office equipment 71, FIG. 7 to the apparatus at prepay paystation telephone 70 and return supervisory signals as desired by the operator in the distant toll office.

To promote a better understanding of the interoffice signalling arrangement described in the following specification, the drawing sheets should be placed in the respective order shown in FIGURE 8.

*Establishment of connection*

Figures 5B, 6, 7:
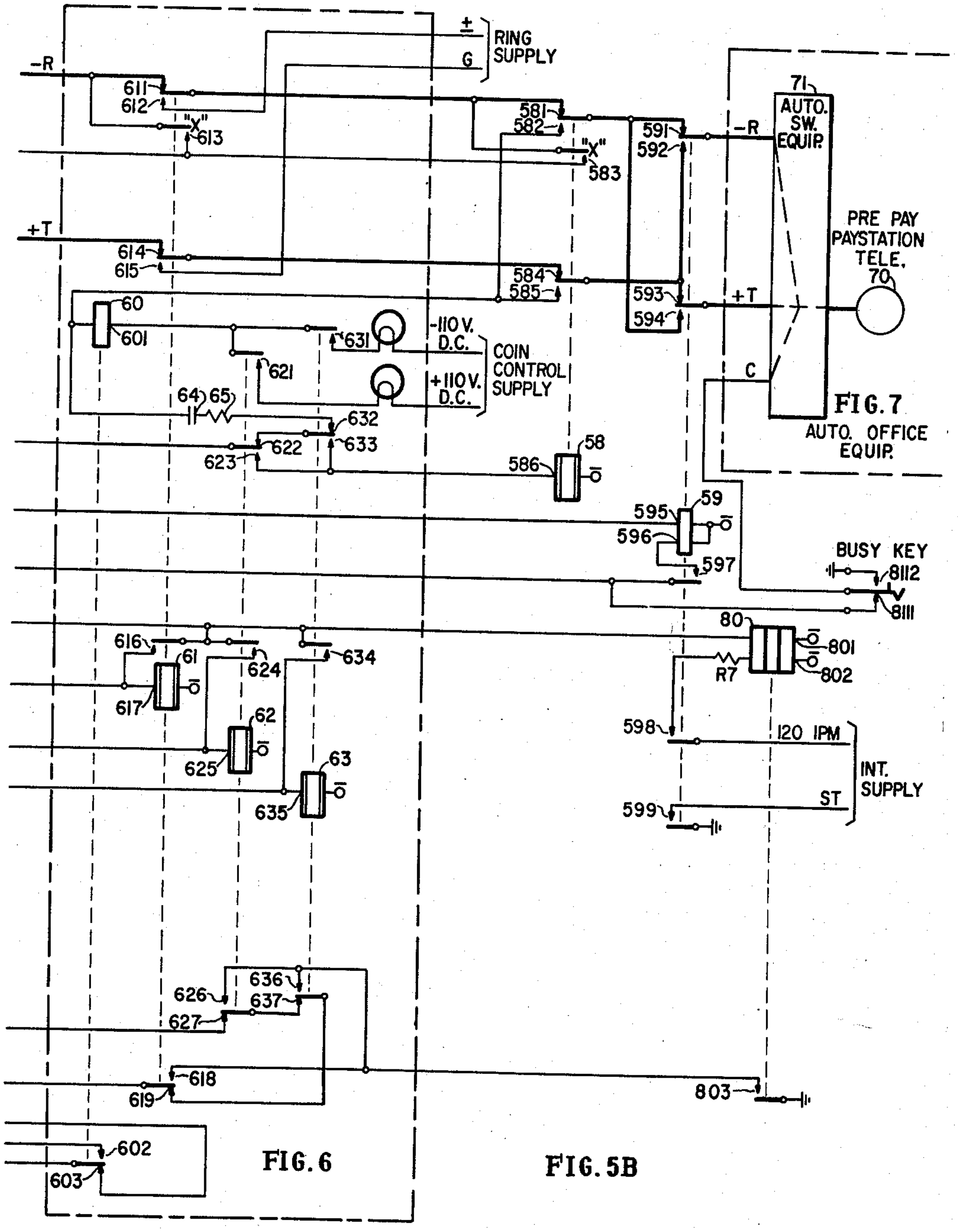
FIGURE 6 is an outlined portion of the paystation CLR trunk circuit showing apparatus operable for applying control signals over established connections to a prepay paystation telephone in the automatic office.
FIGURE 7 shows a diagrammatic illustration of the automatic switching equipment used in establishing a call from a prepay paystation telephone connected thereto.

In making a toll call, the prepay paystation telephone subscriber will deposit a coin in the coin chute of the telephone and be connected to the automatic switching equipment 71, FIG. 7. The subscriber then proceeds to dial the directory code assigned for toll service, thereby setting up a connection through the automatic switch train and seizing an idle paystation CLR trunk circuit, such as that shown in FIG. 5B. In this particular instance the seizure is from ground in, say, a Strowger type selector, not shown, and by way of lead C, FIG. 5B contact 8111 of the busy key, contacts 505, 551 to resistance battery which serves as the idle marking for the trunk circuit. Upon switch-through of the selector the subscriber's line loop is extended to + and — leads of FIG. 5B, the + side of the line continuing on through contacts 593, 584, 614, and winding 522 of battery-feed relay 52 to ground, while the — side of the line connects through contacts 591, 581, 611, and winding 523 of relay 52 to battery. The line loop closure causes the operation of battery feed relay 52 which in turn completes a circuit from ground through contact 524 and winding 503 of hold relay 50 to battery. Relay 50 operates, removes resistance battery potential from the C-lead and replaces it with direct ground. This ground is used for holding the preceding equipment operated, and it serves as a busy indication to all other selector bank access points. In operating, relay 50 also closes contacts 502 to superimpose interrupted generator back to the calling loop as a ringback tone so that the calling subscriber will know that the toll operator is being signalled. The operation of the battery feed relay 52 in the paystation CLR trunk circuit also changes the state of signalling from an on-hook to an off-hook condition as represented by the removal of the ground through contact 527 and the replacement by battery through the lamp and contacts 526, 603 to the signal-out conductor 8117, which is associated with signal-out conductor 426 of FIG. 4.

As related above, this change to an off-hook condition is reflected in the operation of relay 23 at the distant toll office, namely through the medium of polar relay 403. Relay 23 completes a circuit to answer lamp 13, FIG. 1 in the face of the toll board, namely by way of ground, contacts 234, 225, 219, and lamp 13 to battery. The lamp glows to inform the toll board operators that a prepay paystation subscriber wishes to make a toll call.

*Answering and automatic refund*

It will now be shown how upon answering of the call by the toll operator, ringback tone is removed from the transmission leads, the initial coin deposit is refunded, and a corresponding supervisory signal returned to the toll operator. The toll operator will acknowledge the call by inserting the plug of her cord circuit into the jack associated with the answer lamp shown in FIG. 1. This will extend battery forward over the sleeve conductor S, winding 204 of relay 20 to ground. Relay 20 operates, closes a circuit to relay 22 by way of contacts 202 and winding 222. Relay 22 operates and locks through its own contacts 223 and 232 to ground. It also opens the answer lamp circuit and by opening the contacts 225 causes the lamp to go dark. Another set of contacts 221, closes a circuit from ground, contacts 201, 221, winding 215 of relay 21 to battery. Relay 21 operates and at contacts 212 removes the line termination circuit consisting of capacitor 286 and resistor 287 normally bridged across the transmission leads +T and —R. The operation of relay 21 also serves to change the state of signalling back to the automatic office, through the interoffice signalling facilities, FIG. 4, namely by removing the ground standing on signal-out lead 289 and replacing it with a battery potential. This change from an on-hook to an off-hook condition consists in the removal of ground at contacts 2112 and replacement by battery potential through lamp 281, contacts 2111, 248, and 278, to the signal-out lead 289. This off-hook condition is reflected in the operation of polar relay 425 at the distant office and hence the operation of relay 51 from ground on the signal-in conductor 8116 through winding 514 of relay 51 to battery. Relay 51 controls the operation of relay 54 through contacts 511, 8115, 535 and winding 544 of relay 54, and also the operation of relay 59 through winding 595 of relay 59 and the same set of contacts. Relay 59 operates, closes the locking circuit from battery through its winding 596 then contacts 597, and 504 to ground. It also projects ground through contacts 599 for starting an interrupter supply circuit not shown, which in turn generates 120 IPM ground pulses for service back through contacts 598, resistor R7 and winding 802 of the shunt field relay 80 to battery. Relay 80 does not operate by this means alone but is prepared for the closure of the circuit to its other winding 801 which produces a magnetically aiding field. As noted above, the circuit has also been closed for the operation of relay 54. It in turn completes the operating circuit for relay 53 by ground through contacts 543 and winding 533 of relay 53 to battery. Relay 53 completes its own locking circuit through winding 533, then contacts 534, 8115 and 511 to ground at the incoming signal relay 51. Relay 53 also operates to remove the interrupted generator at contacts 531, and by the absence of ringback tone indicates to the calling subscriber that the toll operator has answered this call signal.

Returning now to relay 54, although the operating ground has been removed by the opening of contacts 535, the relay has slow to release characteristics such that ground at contacts 546 can be extended through the windings 574 of rotary switch 57 to battery and cause the motor magnet of the rotary switch to operate. At contacts 545 relay 54 establishes a connection from ground through contact 545 and winding 635 to battery, causing the coin refund relay 63 to operate. By this time the field of relay 54 has collapsed and allows contacts 546 to return to their normal open position. Since the motor magnet winding 574 has thereby been deenergized, the driving spring of the rotary switch is effective to move the switch wipers from their normal home position to a resting place on the first bank contacts.

In this operation of the rotary switch, associated off normal springs change their state and remain as such until the switch again assumes its normal position. Accordingly, a circuit is closed from ground through off normal spring contacts 571 and winding 801 to battery. This energizes winding 801 and causes the shunt field relay 80 to operate. The ground at contacts 571 is also effective through contacts 634 for holding relay 63 in an operated condition until the rotary switch returns to its normal position. Another circuit established by the return of relay 54 to normal is from ground at contacts 542, through contacts 633 and winding 586 of relay 58 to battery. Relay 58 operates its preliminary make contacts 583 and sets up a holding bridge circuit for relay 52 through other contacts 611, 521, resistor 8113 plus windings 522 and 523' This insures that relay 52 will not release when other contacts on relay 58 open the line loop back to the calling station. The operation of relay 58 also extends the coin refund potential −110 volt D.C. through a protective lamp, over contacts 631, winding 601 of relay 60, contacts 582, 585, 592 and 594, back to the calling subscriber's paystation telephone equipment. Thus the initial coin deposit is returned to the calling subscriber by the coin return magnet, not shown, of paystation 70 in a manner well known in the art.

As a means of conveying corresponding supervisory information to the toll operator, the energization of winding 601 causes the operation of relay 60, which by opening its contacts 603 removes the off-hook signal condition and then replaces it with an on-hook condition signified by a direct ground through contacts 602 to the signal out lead 8117. With the aid of the polar duplex signalling arrangement, FIG. 4 this change is reflected, in the toll office trunk circuit by the restoration of relay 23 to its normal position. Upon the release of relay 23, ground through contacts 231, 224, 218 and a comparatively low resistance winding 203 of relay 20 changes the supervisory condition of the cord circuit and the operator learns from the lighted supervisory lamp that refund operations have occurred at the prepay paystation telephone. The duration of this coin refund supervisory signal is determined by the length of time the on-hook signalling condition is maintained at the distant office under the control of relay 63, and therefore dependent upon the restoration of the signal receiving switch 57, FIG. 5B.

Referring again to FIG. 5A, during the course of the above operations relays 55 and 56 operated and then returned to their normal position as shown. Their function in the circuits will be noted later in this specification. With these relays in their normal position a path is now closed for self-interrupted stepping of the rotary switch 57 towards its home position. This path is from ground through contacts 552, 563, interrupter spring contacts 573, wiper contacts 577 resting on the associated bank contacts in steps 1 to 7 which are multipled with each other, then on through the off normal spring contacts 576 and winding 574 to battery. By the fact that the interrupter spring contacts are opened after the energization of winding 574, a self-interrupting circuit is formed which permits the rotary switch driving spring to advance the wipers consecutively to a resting place on the 8th set of bank contacts. The advance of the wipers 577 from the 7th to the 8th bank contacts of level A determines another condition for the stepping circuit. Instead of being self-interrupting as noted, the rotary switch will now be driven from an outside source, namely the 120 I.P.M. ground impulses produced by contacts 803 and sent forward through contacts 636, 619, wiper contacts 577, off normal spring contacts 576, and winding 574 to battery. The rotary switch motor magnet is energized and operated at the 120 I.P.M. rate, allowing the driving spring to advance the wipers beyond the bank contacts 8, 9 and 10 and thereby return to their normal position on contacts N. Upon completion of these stepping operations, the off normal springs having contacts 571 and 576 return to their normal state as shown in FIG. 5A. In so doing, the spring contacts 571 remove the holding ground for relay 63 and the same operating ground for the shunt field relay 80. Both relays restore their springs to normal. In the case of relay 63 a path is created for dissipating stored electrical energy which may have resulted from the application of coin refund potentials through winding 601 to the subscriber's telephone apparatus. Such energy is dissipated by way of capacitors 64, resistor 65, contacts 632, 622, and 542 to ground. This relay 63 also restores its spring contacts 631 and breaks the operating circuit to winding 601, thus permitting relay 60 to restore its contacts. The result is the change from an on-hook to an off-hook condition on the signal-out lead 8117 as determined by the opening of contacts 602 and the closing of contacts 603. The effect of this change is the projection forward from the terminal apparatus 40 at the distant end of the signalling path, of ground which again reoperates relay 23 of FIG. 2A over the signal-in lead 288 and thereby removes the ground through contacts 231, 224, 218 and the low resistance winding 203 so that the supervisory lamp in the cord circuit restores to its original dark condition. The opening of contacts 633 allowed relay 58 to restore its contacts 583, 581 and 584 to the status it had prior to this initial coin refund operation. The station line loop transmission path is thereby completed so that the subscriber can converse with the toll operator and provide her with specific information pertinent to the toll call desired.

The toll operator then establishes the connection in the standard manner and may be required to control any or all of the following operating conditions in the remote automatic office according to dictates of the toll call. In this connection it will be noted that the transmission of three impulses from the toll office to the automatic office represents coin collect, five impulses denote re-ring (or ring) functions, and seven impulses represent coin refund. The sending switch and the receiving switch both return to the normal home position after the transmission of a given control signal.

*Manual coin collect*

Figures 1, 2A, 8:
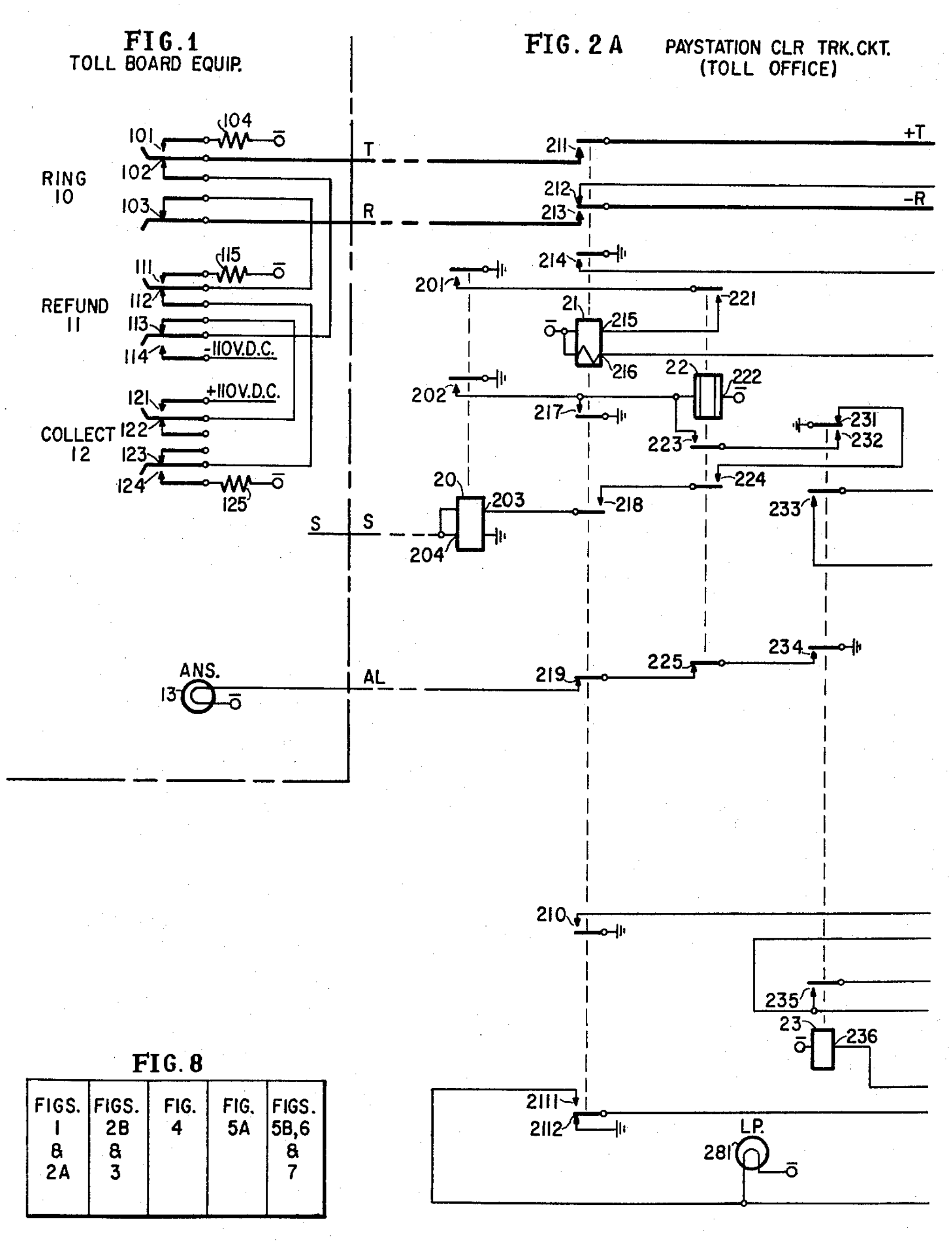
FIGURE 1 represents portions of the toll board equipment, such as position and cord circuit keys, used by a toll operator in applying certain electrical control potentials after the establishment of a connection to a paystation CLR trunk circuit.
FIGURES 2A and 2B (2 sheets) show the principal portion of a paystation CLR trunk circuit, including a signal sending switch, at the toll office.
FIGURE 8 illustrates the manner of combining FIGURES 1 to 7, inclusive of the drawings to form a unified system.

Assuming that a coin collect operation is required, the toll operator operates the collect key 12, FIG. 1, and thereby completes a circuit from resistance battery 125, through contacts 124, 112, 103, 213, a winding of retard coil 30, and winding 313 to ground. This enables relay 31 to operate and complete a circuit from +110 v. D.C. at collect key 12 through contacts 121, 113, 102, 211, then another winding of the retard coil 30, continuing on through contacts 312, 233, conducting diode 344, and winding 333 to ground. The diode 344 forms a low resistance path around winding 343 so that relay 34 will not operate at this time. Relay 33 operates to close a ground marking potential through contacts 335 to the bank contact 3 of rotary switch 25, and also closes a locking path from ground through contacts 214, 271, 331 and winding 332 to battery. Another pair of contacts closes the circuit for the operation of relay 24. This circuit is from ground through contacts 210, 337, 235, and winding 246 to battery. The markings are now established for enabling the rotary switch circuit to progressively generate the three impulses noted above.

Relay 24 operates, opens the voice transmission path at contacts 241 and 242 for the duration of the coin collect operation, and by way of contacts 243 bridges line termination apparatus 286 and 287 across the +T and −R conductors of FIG. 2B. Other contacts, namely 247 and 248 of relay 24, operate for transferring the on-off signal control source to contacts 267 and 268 of relay 26 for the duration of a desired digital impulsing period. During all other times the control source reverts to contacts 2111 and 2112 of relay 21 by a subsequent operation of contacts 277 and 278 of relay 28, thus insuring that additional impulsing digits generated by the rotary sending switch during its return to home position will not be effective on the signal-out conductor 289.

The signal sending switch in paystation CLR trunk circuit FIG. 2A at the toll office has associated therewith as its principal apparatus, interrupter spring contacts 254, relay 26, contacts 261, and motor magnet winding 252, which combine to form a self-interrupting source for the generation of digital impulses at contacts 267 and 268 of relay 26 after relay 24 has operated and closed its contacts 244. It is apparent that self-interruption of the switch results from the action between two individual circuit paths. One path being from ground through contacts 274, 261, 244, and winding 252 of the rotary switch 25 to battery, while the other path is ground through the interrupter spring contacts 254, winding 264 of relay 26, and resistor 263 to battery. In either instance, the closure of one path will cause the operation of apparatus which in turn opens the other path, allowing its associated apparatus to restore to the normal position.

More specifically, for the transmission of coin collect signals as being described, relay 24 has operated, and at contacts 244 has completed the circuit to motor magnet winding 252, which becomes energized and closes the ground through interrupter springs 254, winding 264, and resistor 263 to battery. Relay 26 operates and controls two circuits, one being the removal of off-hook potential at contacts 268 and its replacement by an on-hook potential as signified by ground through contacts 267, 247, 278 to the signal-out conductor 289; while the other control is exerted over the release of motor magnet winding 252 by opening contacts 261. This permits the rotary switch driving spring, not shown, to advance the bank wiper 251 off its home position N and come to a temporary resting place on bank contact 1. Coincident with this operation, the off normal springs operate, provide a holding ground for relay 24 by way of contacts 256 and 245 until the rotary switch again restores its wipers 251 to the home position N, while the interrupter spring contacts 254 open the circuit to relay 26. Relay 26 restores its contacts 261 for further operation of the rotary switch, and also reverts the state of signalling on the signal-out conductor 289 to an off-hook condition by virtue of opening contacts 267 and closing contacts 268.

The rotary signal sending switch continues to operate in a similar manner until the wiper 251 comes to rest on the bank contact 3 which as been marked by ground potential as noted above. A circuit is then completed from ground, through contact 335, wiper 251, and winding 272 to battery. Relay 27 operates, locks through its winding 273, contacts 276, and off normal spring contact 256 to ground, holds a self-interrupting circuit open at contacts 274, and opens the locking circuit of coin collect relay 33 at contacts 271, relay 27. The operation of relay 27 also opens contacts 278, closes contacts 277, and thereby insures that additional impulses will not be sent forward over the signal-out conductor 289 as related above.

As a summary of the rotary sending switch operations described, interrupter relay 26 has been responsive to each of the three steps taken by the rotary switch 25, and by means of its contacts 267, 268 has generated a corresponding series of three impulses for the circuit extended to signal-out conductor 289. It will be noted that diode 262 bridges winding 264 of relay 26 and absorbs the inductive energy which would otherwise produce a destructive spark upon opening the circuit at the interrupter spring contact 254. A further feature of relay 26 is the arrangement whereby break and make characteristics of its impulsing contacts 267 and 268 can be influenced by an independent circuit consisting of a winding 265 in series with the resistor 266 having a variable control for regulating the current therein.

Recalling that relays 50, 51, 52, 53, FIG. 5A and 59, FIG. 5B of the paystation trunk circuit in the automatic office have remained operated, the following will describe the action resulting from the 3 digital impulses impressed upon the signal-out conductor 289, FIG. 2B and then transmitted over the signalling path of the interoffice facilities shown in FIG. 4, with each of these impulses becoming effective as a release and subsequent operation of relay 51, FIG. 5A.

From a review of the operations described for the initial coin refund, it will be evident that relay 51 now becomes a driving source responsive to the 3 impulses received, for the advancement of the rotary switch 57, FIG. 5A, until its wipers 572 and 577 each come to rest on their respective bank contact 3. Such a driving circuit is from ground through contacts 513, 536, and motor magnet winding 574 to battery. This circuit path is supplemented by another by way of off normal spring contacts 575 and winding 555 to battery for the operation of relay 55 during the first impulse. Relay 55 locks through its contacts 554, then contacts 536, and 513 to ground for the duration of the impulsing period. Relay 55 also establishes a control for the operation of relay 56 from ground through contacts 553, and winding 561 to battery. At the end of the impulsing period, relay 51 again operates and by opening contacts 513 directly causes the release of relay 55 which in turn by opening contacts 553, allows relay 56 to release. In the interim, however, the slow to release characteristics of relays 55 and 56 are such that relay 55 retores its contacts first and establishes a circuit from ground through contacts 552, 562, wiper 572 resting on rotary switch bank contact 3, continuing on to winding 625 to battery. Relay 62 operates, locks through its contacts 64 to ground at the off normal spring contacts 571.

From an inspection of FIG. 6, it will be apparent that this relay 62 is similar in structure and wiring connections to relay 63. In considering the ensuing operations of the rotary switch 57, relays 60, 58, and 80 as set in motion by the operation of relay 62, it will be evident that +110 volt D.C. coin collect potential is applied over the line loop to the prepay paystation telephone rather than −110 volt D.C. coin refund potential as previously described, in connection with the explanation of the automatic refund operation. Further operations closely parallel to this prior explanation in that a supervisory signal is returned to the toll operator until the rotary switch 57 again returns its wipers to their home position N upon completion of the signal receiving operation. In this connection it will be noted that the designations of relay 62 and also the function of these contacts correspond closely to the contacts of relay 63, the operation of which has been described in detail above.

However, in the toll office certain other operations will now take place which did not occur during the above described initial coin refund. Namely, the release of rotary switch 25, FIG. 2B, dependent upon a prior release of relay 33. When, incident to the transmission of the just mentioned coin collect supervisory signal, relay 23 restores in the toll trunk circuit, FIG. 2A, the circuit of the lower winding of relay 33 is broken at contacts 233 so that relay 33 restores. Or otherwise by a prior release of relay 33 responsive to the opening of key contacts 121 when the toll operator restores the collect key 12, FIG. 1. Relay 33 upon restoring its contact 336, closes a self-interrupting circuit to the motor magnet of rotary switch 25 by way of ground through interrupter spring contacts 255, contacts 326, 336, 346, 275, off normal spring contacts 253, and motor magnet winding 252 of rotary switch 25 to battery. It will be noted that contacts 255 provide the interruptions for the motor magnet winding 252, whereas contacts 254 are the driving means for relay 26. Relay 26 will evidently continue to alternately operate and release until the rotary switch has advanced its wipers 251 to a resting position on bank contact N. The off normal springs return to their normally open condition shown in FIG. 2B. The self-interrupting circuit is then opened at contacts 253, whereas the holding circuits to relays 24 and 27 are opened at off normal contacts 256. Both relays restore their contacts to normal. Relay 24 removes the line termination at contacts 243, and again closes the voice transmission path at contacts 241 and 242.

From the above description of the interoffice signalling arrangement used for the transmission of coin collect signals from the toll office to a remotely located automatic office it will be clear that, according to one feature of this invention, a marking applied to a trunk circuit at one office will initiate the automatic transmission over the established signalling path of a series of digital impulses, while at the remote office trunk circuit these impulses will be received and converted into corresponding relay operations for automatically extending the locally applied control signals representative of the originating marking.

*Manual coin refund*

Coin refund operations may be controlled by the operator during the establishment of the toll call, such as when she must refund an excess coin deposit. This is apart from the initial coin refund which had occurred automatically as previously described in the specification. In this case the procedure conforms with coin collect operations except that −110 volt D.C. applied through contacts 114 of refund key 11, FIG. 1, operates relay 34 and through contacts 345 marks the bank contact 7 of rotary switch 25. The seven impulses correspondingly generated at contacts 267, 268, of relay 26, FIG. 2B, are transmitted over the signalling path, FIG. 4, and then translated by the rotary signal receiving switch 57, FIG. 5A, into the establishment of a circuit through bank contact 7 of level B, for the operation of relay 63. Relay 63 operates, and at its contacts 631 extends the local −110 volt D.C. coin control supply for refunding the coins in the chute of the prepay paystation telephone. Then the trunk circuit automatically returns a supervisory signal to the toll office operator in a manner analogous to that above described for coin collections, thereby informing the operator that controls have been completed as desired and that the signal receiving switch has returned to normal.

*Re-ring*

The toll operator may find it necessary to temporarily dismiss the prepay paystation subscriber and then call him when the toll connection can be completed. In this case the subscriber restores the telephone handset, thereby establishing an on-hook condition in his associated paystation CLR trunk circuit. This change in the status of signalling is reflected at the toll office as a lighted cord supervisory lamp in front of the toll operator. The toll operator has retained control over the release of the established connection, however, and can signal the subscriber at will by operating the ringing key at her toll position.

In this instance the toll operator actuates ringing key 10, FIG. 1, completing a circuit from resistance battery 104, key contact 101, through a winding of retard coil 30, then contacts 311, and winding 324 of relay 32 to ground. Marking relay 32 operates, completes a locking circuit for itself through winding 323 in series with contacts 322, 271, 214, and non-inductive winding 216 of relay 21. Thus relay 32 will remain operated during the impulse sending operations, and until the locking circuit is open at contacts 271 of relay 27. Whereas the start of the signal sending switch during coin control services is dependent on the existence of an off-hook condition at the distant automatic office, this is not true in the case of re-ring service, where there must rather be an on-hook status. Instead of including contacts 235 of relay 23, the operating circuit of start relay 24, is now from ground through contacts 210, 327, and winding 246 of relay 24 to battery. Relay 24 operates, triggers the start of stepping operations as previously explained until the rotary switch wiper 251 comes to rest on the bank contact 5 to which is connected the ground marking from contact 325.

The five digital impulses which are generated in a manner similar to that described before, are transmitted to the distant paystation CLR trunk circuit FIG. 5A where they become effective as advancement of the rotary receiving switch 57, enabling each of its wipers 572 and 577 to be set on their associated bank contact 5. A circuit is closed through level B through contacts 512, 525 and winding 617 of relay 61 to battery. Relay 61 operates, locks through its contacts 616 to the ground at off normal spring 571, which also serves to operate the shunt field relay 80 through winding 81 as previously explained. It will be evident that relay 61 closes its contacts 613 and bridges the line termination apparatus 8113 and 8114 across the transmission conductors prior to opening the path at contacts 611, 614, and applying the ringing potential to the paystation telephone by way of make contacts 612 and 615. The line loop circuit at contacts 611 and 614, enables battery feed relay 52 to operate when the subscriber answers the telephone. Contacts 526 and 527 of relay 52 change the status on signal-out conductor 8117 from an on-hook to an off-hook condition. This change is reflected in the toll operator's position by a dark cord supervisory lamp as determined by the opening of contacts 231 when relay 23, FIG. 2A operated.

Upon completion of the re-ring operations, the signal sending and signal receiving switches have returned to their normal position and become available for coin control services required during the toll call substantially as previously explained.

The further operations of the trunk circuits, for example, the restoration of the equipment to normal at the end of a conversation, have no bearing on the invention and thus require no detailed description.

It is to be understood that the above-described arrangements are illustrative of the application of this invention. Although the embodiment of the invention has been explained in connection with one-way trunk circuits, the interoffice signalling arrangement is equally adaptable to two-way trunking methods.

What is claimed is:

1. In a telephone system, two offices, a transmission medium, having a two-way signalling path, extending between said offices, two trunk circuits connected to said path in said two offices respectively, each said trunk circuit including signal sending apparatus and signal receiving apparatus, said signal sending apparatus being operated in response to on-off hook signals originating at the respective office end for transmitting corresponding electrical signals over said path to said signal receiving apparatus in the remote office, the said signal sending apparatus at one of said office ends including transmitting means operated in response to control signals originating at said end after the establishment of the connection for transmitting over said path to the signal receiving apparatus in the other office a train of digital impulses corresponding to a particular control signal to be sent, and the last-mentioned signal receiving apparatus including receiving means operated by said impulse train for converting said train of impulses into the corresponding one of a plurality of electrical controls.

2. The combination in a telephone system as claimed in claim 1 wherein the signal sending apparatus at the said other office end also includes transmitting equipment operated in response to at least certain of said electrical controls for momentarily transmitting acknowledgement signals in the form of an on-hook signal over the said signalling path, and wherein the signal receiving apparatus in the said one office includes receiving equipment for converting said on-hook signal into a corresponding supervisory signal.

3. The combination in a telephone system as claimed in claim 1 wherein said two-way signalling path is terminated by terminal apparatus in each of said two offices, and wherein two conductors for signalling-in and signalling-out respectively are interposed between each said terminal apparatus and the corresponding trunk circuit.

4. The combination in a telephone system as claimed in claim 3 wherein said sending apparatus is operated in response to said on-off hook signals to switch said signal-out conductor from one to another potential, and wherein said transmitting means in said one office includes switching devices for transmitting over said signal-out conductor a train of impulses each of which involves the switching of said conductor from one of said potentials to the other.

5. The combination in a telephone system as claimed in claim 3, wherein the receiving apparatus at said control signal originating end includes a switching device operated in accordance with the existence of an off-hook condition at the other end, and wherein there are provided circuit connections for making the transmission of at least some of said trains of impulses dependent on the operation of said switching device.

6. The combination in a telephone system as claimed in claim 3 wherein said transmitting means comprises a rotary switch having a wiper and contact bank, means for applying a marking to said bank which corresponds to any of said control signals and for causing said rotary switch to rotate said wiper to a predetermined position in search of said marking, and means for transmitting a corresponding train of digital impulses over said signal-out conductor.

7. The combination in a telephone system as claimed in claim 6 wherein said receiving means comprises another rotary switch having a wiper and bank, means for stepping the last-mentioned switch, substantially in synchronism with said first switch, to a predetermined position, and circuit connections extending over the wiper and bank of the last-mentioned switch in said position for providing a marking substantially corresponding to the original marking applied to the bank of said first switch.

8. The combination in a telephone system as claimed in claim 1 wherein at least one of said particular control signals is a pre-paystation coin collect signal of one direct current potential and another of said signals a pre-paystation coin refund signal of another direct current potential, said transmitting means operating to convert each of said coin control signals into an impulse train comprising a different number of digital impulses, and said receiving means operating to reconvert each said impulse train into a coin control corresponding substantially to the original direct current signal.

9. The combination in a telephone system as claimed in claim 8 wherein yet another of said particular control signals is an alternating current ringing signal, said transmitting means operating to convert said ringing signal into an impulse train comprising yet another number of digital impulses, and said receiving means operating to reconvert the last-mentioned impulse train into a ringing control corresponding substantially to the original alternating current signal.

10. The combination in a telephone system as claimed in claim 8 wherein said one office is a toll office with an operator's switchboard and the trunk in said office a toll trunk, and wherein the said other office is an automatic office and the trunk in said office a paystation trunk, the said transmitting means being responsive to the receipt of one of said coin control signals from said switchboard to convert said signal into an impulse train comprising a predetermined number of digital impulses, and the receiving means in said automatic office being responsive to the receipt of said impulse train to reconvert said train into a coin control corresponding substantially to the original direct current signal.

References Cited by the Examiner

UNITED STATES PATENTS 2,374,964 5/45 Walsh ---------------- 179—6.3

ROBERT H. ROSE, *Primary Examiner.*

WILLIAM C. COOPER, *Examiner.*